United States Patent
Gupta et al.

(10) Patent No.: US 11,516,235 B2
(45) Date of Patent: Nov. 29, 2022

(54) SYSTEM AND METHOD FOR DETECTING BOTS BASED ON ANOMALY DETECTION OF JAVASCRIPT OR MOBILE APP PROFILE INFORMATION

(71) Applicant: KAALBI TECHNOLOGIES PRIVATE LIMITED, Bengaluru (IN)

(72) Inventors: Neeraj Kumar Gupta, Bengaluru (IN); Aman Rawka, Bangalore (IN); Harisankar Haridas, Bengaluru (IN); Rakesh Thatha, Bengaluru (IN); Sonal Lalchand Oswal, Bengaluru (IN)

(73) Assignee: Kaalbi Technologies Private Limited, Bengaluru (IN)

( * ) Notice: Subject to any disclaimer, the term of this patent is extended or adjusted under 35 U.S.C. 154(b) by 525 days.

(21) Appl. No.: 16/592,294

(22) Filed: Oct. 3, 2019

(65) Prior Publication Data
US 2020/0112578 A1  Apr. 9, 2020

(30) Foreign Application Priority Data
Oct. 4, 2018  (IN) .............................. 201841037449

(51) Int. Cl.
| | |
|---|---|
| *H04L 9/40* | (2022.01) |
| *H04L 67/01* | (2022.01) |
| *H04L 41/046* | (2022.01) |
| *G06N 20/00* | (2019.01) |
| *G06N 5/04* | (2006.01) |

(52) U.S. Cl.
CPC .......... *H04L 63/1425* (2013.01); *G06N 5/04* (2013.01); *G06N 20/00* (2019.01); *H04L 41/046* (2013.01); *H04L 63/1441* (2013.01); *H04L 67/42* (2013.01); *H04L 2463/144* (2013.01)

(58) Field of Classification Search
CPC ............... H04L 63/1425; H04L 41/046; H04L 63/1441; H04L 67/42
See application file for complete search history.

(56) References Cited

U.S. PATENT DOCUMENTS

| | | | | |
|---|---|---|---|---|
| 10,372,780 | B1* | 8/2019 | Lepeska | H04L 67/2842 |
| 2009/0011743 | A1* | 1/2009 | Johanson | H04M 3/42068 |
| | | | | 455/414.1 |
| 2020/0112578 | A1* | 4/2020 | Gupta | H04L 41/0853 |

* cited by examiner

*Primary Examiner* — Minh Chau Nguyen
(74) *Attorney, Agent, or Firm* — M&B IP Analysts, LLC

(57) ABSTRACT

A system and method for detecting bots. The method includes receiving a request to access a server, the request is being received from a client device, and responsive to the request, causing the client device to download a script code file to the client device. The script code file, when executed, collects a profile, and the profile includes a plurality of parameters. The method also includes receiving the created profile, generating a score based on the plurality of parameters to identify a bot, and initiating a mitigation action based on the identified bot.

19 Claims, 7 Drawing Sheets

FIG. 3

SYSTEM AND METHOD FOR DETECTING BOTS BASED ON ANOMALY DETECTION OF JAVASCRIPT OR MOBILE APP PROFILE INFORMATION

CROSS-REFERENCE TO RELATED APPLICATIONS

This application claims the benefit of Indian Provisional Application No. 201841037449 filed on Oct. 4, 2018, the contents of which are hereby incorporated by reference.

TECHNICAL FIELD

The embodiments herein relate to a field of computer networks. The present invention is particularly related to detecting malicious activities in computer networks, and especially related to detecting bots.

BACKGROUND

A "bot" usually refers to a computer program that is used to access web properties like websites and Application Programming Interface (API)s. Bots are typically used for performing malicious activities like content scraping, spamming, account takeover and advertising fraud. Many bots spoof their user agent to masquerade as a legitimate popular browser running on a legitimate device.

Moreover, a bot detection refers to techniques, which classify a visitor accessing a web property as human or bot. A detection of spoofing of browsers/apps and devices is one of the approaches to bot detection. The bot detection is performed using multiple sources of information. These sources of information include the HTTP headers associated with the requests made by the clients and a profile of the client-side JavaScript or mobile app stack present in the client browser or mobile app. For example, certain HTTP headers are supported only by certain browser versions. Similarly, certain JavaScript® or mobile app features are only supported by certain browser or app versions. Inconsistencies in headers and JavaScript profile are commonly used to detect bots. The prevailing techniques for JavaScript profile-based bot detection are rule-based. In these techniques, rules which catch specific inconsistencies are hand-crafted by a human and these rules are used to detect bots.

However, the Internet consists of billions of users using tens of thousands of web browsers, applications, and device configurations, with numerous versions. New kinds of devices and browsers are also emerging at a high rate. This also increases a diversity of HTTP headers and client JavaScript and mobile app stack associated with the clients/browsers. This high level of diversity and dynamicity limits an applicability of the hand-crafted rule-based solutions to detect spoofing. New rules need to be developed and existing rules need to be improved at a high rate. Maintaining the rule set involves a significant amount of human data analysis and experimentation. Thus, a manual hand-crafting of the rules is not enough to detect spoofing at web scale. Despite the limitation of hand-crafted rules, there has been little attention on automated machine learning-based techniques to detect bots based on the client-side JavaScript or mobile app profile.

In view of the above discussion, there is a need for bot detection techniques that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting bots. The method includes receiving a request to access a server, the request is being received from a client device, and responsive to the request, causing the client device to download a script code file to the client device. The script code file, when executed, collects a profile, and the profile includes a plurality of parameters. The method also includes receiving the created profile, generating a score based on the plurality of parameters to identify a bot, and initiating a mitigation action based on the identified bot.

Certain embodiments disclosed herein also include a non-transitory computer readable medium having stored thereon instructions for causing a processing circuitry to execute a process for detecting bots. The process includes receiving a request to access a server, the request is being received from a client device, and responsive to the request, causing the client device to download a script code file to the client device. The script code file, when executed, collects a profile, and the profile includes a plurality of parameters. The method also includes receiving the created profile, generating a score based on the plurality of parameters to identify a bot, and initiating a mitigation action based on the identified bot.

Certain embodiments disclosed herein also include a system for detecting bots. The system includes a processing circuitry, and a memory. The memory contains instructions that, when executed by the processing circuitry, configure the system to receive a request to access a server, the request being received from a client device, responsive to the request, cause the client device to download a script code file to the client device. The script code file, when executed, collects a profile, the profile includes a plurality of parameters. The system is also configured to receive the created profile, generate a score based on the plurality of parameters to identify a bot, and initiate a mitigation action based on the identified bot.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 3 illustrates a table listing exemplary anomalous script code profiles detected using the system, according to one embodiment.

DETAILED DESCRIPTION

Figure 1:
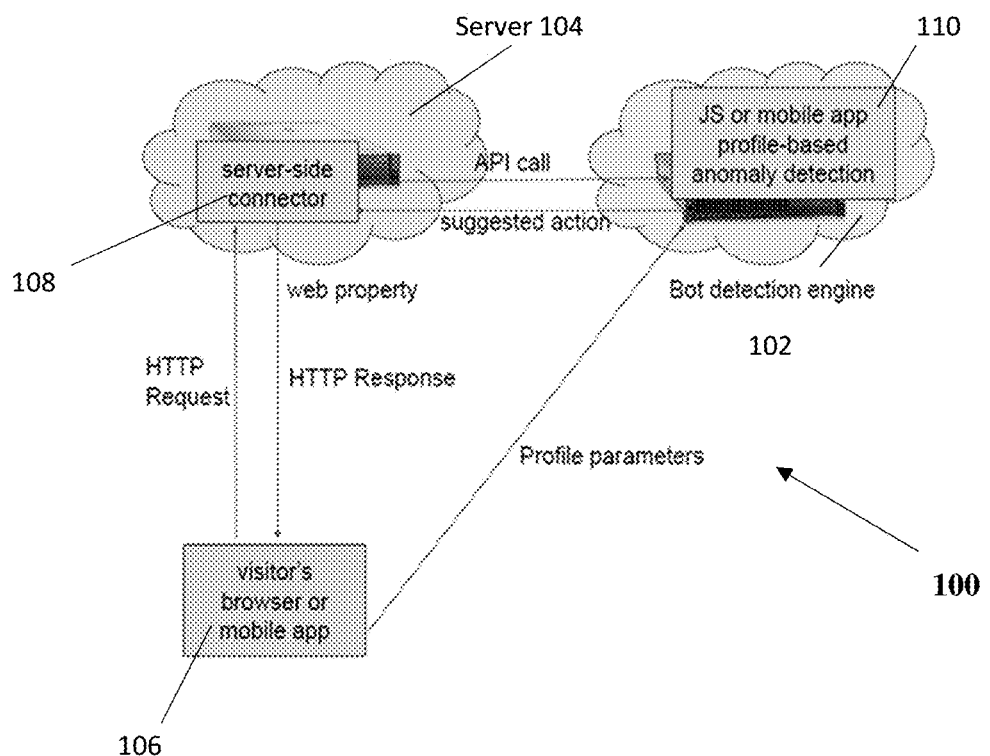
FIG. 1 illustrates a block diagram of a system for bot detection, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein provide for a system and method for script code or mobile application (app) profile-based bot detection. The script code may include, but is not limited to, JavaScript®.

Also, the embodiments herein provide for an automated anomaly detection-based system and method for detecting bots which are spoofing their browsers and devices based on their script code or mobile app profiles.

Further, the embodiments herein provide for a system and method for unsupervised machine learning-based anomaly detection of the script code or mobile app profiles of the visitors coming to a website.

Also, the embodiments herein provide for a system and method for anomaly detection to build user agent wise separate models so that multiple anomaly detection models are used with different subsets of parameters.

Further, the embodiments herein provide for a system and method for anomaly detection for clubbing user agents together with a smaller user base to apply anomaly detection on these profiles as a whole.

Also, the embodiments herein provide for a method for anomaly detection by using a scoring mechanism based on plurality of HTTP header parameters and detecting anomaly/bot when the cumulative score is less than a threshold value.

Further, the embodiments herein provide for a system and method for bot detection using a scoring mechanism in combination with hand-crafted rules.

Also, the embodiments herein provide for a system and method that combines HTTP headers and Transmission Control Protocol (TCP) parameters with JavaScript or mobile app profile for bot detection.

Further, the embodiments herein provide for a system and method for bot detection by utilizing the anomaly scores to take action against bots.

Also, the embodiments herein provide for a system and method for bot detection to limit an impact on false positives by including rule or model-wise gating which restricts a proportion of visitors on which action is taken.

Further, the embodiments herein provide for a system and method for bot detection through an automatic detection of new browser and mobile app versions and performs bot detection. That is, the embodiments herein provide a system and method for script code (e.g., JavaScript®) or mobile app profile-based bot detection.

In an example embodiment, the system includes a bot detection engine, a server, and a computing device used by a visitor for accessing a browser or mobile app. The server includes a server-side connector installed as a plug-in. The server-side connector is communicatively coupled with the script code or mobile app profile-based anomaly detection component provided within the bot detection engine. The server-side connector is configured to enable an Application Programming Interface (API) call to the anomaly detection component to receive a suggested action.

In a case where a user uses a browser, the server side connector, as a part of an initial client Hypertext Transfer Protocol (HTTP) request, injects a script code snippet and tracking code (e.g., cookie) in web pages generated by the server and send back the response to the computing device of the user. When the page is rendered in the visitor/client browser, the script code snippet downloads a JavaScript file from the bot detection engine and executes it. The script code file execution on the client collects a pre-configured list of parameters indicating the JavaScript profile and the client sends these collected pre-configured list of parameters to the server of the bot detection provider. In case of mobile apps, a Software Development Kit (SDK) provided by the bot detection provider is integrated in the mobile app. The app executes within the client device, collects and sends a set of pre-configured list of parameters to the server of the bot detection provider.

According to one embodiment, a plurality of individual anomaly detection models is trained based on the JavaScript or mobile app profiles of the set of visitors using each major user agent. After training, the model is used for generating an anomaly score for each new visitor. Multiple anomaly detection models are trained based on different subsets of JavaScript or mobile app parameters. The results from these multiple models are combined to generate a final anomaly score. The traffic from the remaining user agents with smaller user base are clubbed together and anomaly detection is applied on this traffic as a whole.

According to one embodiment, various techniques are used to pre-process the script code or mobile app profile parameters. The feature pre-processing is computed at multiple levels including the browser or mobile app, upstream components and the anomaly detection component. The resulting anomaly scores are used in combination with hand-crafted rules.

According to one embodiment a method for script code or mobile app profile-based bot detection is provided. The method includes the steps of client sending a HTTP request to the server. An API call from the server connector is initiated to JavaScript (JS) based anomaly detection component to get/receive a suggested action. In case of browsers, the server sends a response back to the client with embedded tracking code and script code snippet. The JavaScript snippet downloads the JavaScript file from the bot detection engine or Content Delivery Network (CDN). The script code execution on the client collects the JavaScript profile. The collected information is then sent to the bot detection engine. In case of mobile apps, an SDK provided by the bot detection provider is integrated in the mobile app. The app executes within the client device, collects and sends a set of pre-configured list of parameters to the server of the bot detection provider. The method further includes generating a score based on the plurality of parameters for detecting a bot. The method still further includes initiating necessary action based on identification of the bot.

The system 100, as shown in FIG. 1, includes a bot detection engine 102, a server 104, and a computing device 106 from which a user or a visitor accesses, such as a browser or an app. The server 104 includes a server-side connector 108 installed as a plug-in. The server side connector 108 is connected with the anomaly-based detection component 110 implemented within the bot detection engine 102.

In operation, the server-side connector 108 is configured to make an API call to the anomaly detection component 110 and in response gets the suggested action. The server side connector 108, in response to an initial client HTTP request, injects a JavaScript snippet and cookies in the web pages generated by the server 104 in a case where a user is using a web browser, and sends back the response to the user's computing device 106.

In the case where a browser is used, when the page is rendered in the visitor/client's browser, the JavaScript snippet downloads and executes a script code file from the bot detection engine 102. For example, the script code file may be downloaded from a bot detection CDN server.

The JavaScript file execution within the client device 106 collects a pre-configured list of parameters indicating a script code profile, and sends the list of profile parameters to the bot detection engine 102.

In case where a mobile app is used, the app executes within the client device 106, and collects and sends a set of pre-configured list of parameters to the bot detection engine 102.

According to one embodiment, the script code profile includes a plurality of parameters that help in inferring the browser or device stack. Some of the parameters describe the browser characteristics alone, while the remaining parameters indicate both the browser and device characteristics. Examples of both classes of parameters are shown in Table 1 and Table 2 below.

Table 1 shows the parameters with values describing the browser. Table 2 shows the parameters with values describing the browser and device. Here, f1, f2 etc. denote special values assigned for empty or null values. Another set of parameter values are collected for mobile app profile. These include parameters such as device manufacturer name, OS version, processor details, kernel version, vendor ID, battery level etc.

TABLE 2

Parameters with values describing browser and device

| JS parameters | J201 | J217 | J218 | J205 |
|---|---|---|---|---|
| Description | Value of hardware Concurrency | Value of jsHeapSizeLimit | Value of usedJSHeapSize | Value of cpuClass |
| Sample values | Natural number like 3, 44 etc. | Natural number or f1 or f2 | Natural number or f1 or f2 | X86 or ARM or f1 |

According to one embodiment, anomalies in the combination of the parameters indicate a spoofing attack on the browser or the computing device (or user device) 106, where a person or program masquerades as another person or program by falsifying data in order to gain an improper advantage. Some examples of such anomalies are shown in Table 3 and Table 4 below.

In the first example, the operating system mentioned in the user agent does not match with the platform present in the script code profile. In the second example, the layout engine detected through the script code profile is not compatible with the browser version mentioned in the user agent. In another example embodiment, in addition to the JavaScript profile-based features, HTTP headers and TCP parameters are also included as features in the anomaly detection model.

TABLE 3

Example of bots trying to spoof OS in user agent string

| Useragent String | OS detected through Useragent | Browser version detected through Useragent | Platform detected through Javascript |
|---|---|---|---|
| Mozilla/5.0 (Windows NT 6.1; Win64; x64) AppleWebKit/537.36 (KHTML, like Gecko) Chrome/60.0.3112.90 Safari/537.36 | Windows | Chrome 60.0.3112.90 | Linux x86_64 |
| Mozilla/5.0 (Windows NT 10.0; Win64; x64) AppleWebKit/537.36 (KHTML, like Gecko) Chrome/42.0.2311.135 Safari/537.36 Edge/12.246 | Windows | Microsoft Edge 12.246 | Linux x86_64 |

TABLE 1

Parameters with values describing browser

| JS parameters | J257 | J258 | J209 | J211 |
|---|---|---|---|---|
| Description | Check whether webkitGetUserMedia feature is available | Check whether mozGetUserMedia feature is available or not Ex. gumMoz, f1 | Check whether geolocation feature is available or not | Value of navigator vendor |
| Sample values | gumWeb or f1 | gumMoz or f1 | T or f1 or f2 or f3 | Apple,Inc. or Google Inc. or f1 |

TABLE 3-continued

Example of bots trying to spoof OS in user agent string

| Useragent String | OS detected through Useragent | Browser version detected through Useragent | Platform detected through Javascript |
|---|---|---|---|
| Mozilla/5.0 (Macintosh; Intel Mac OS X 10_11_4)) AppleWebKit/537.36 (KHTML, like Gecko) Chrome/50.0.2661.86 Safari/537.36 | OS X | Chrome 50.0.2661.86 | Linux x86_64 |

TABLE 4

Example of bots trying to spoof browser category in user agent string

| Useragent String | Browser version detected through Useragent | Layout engine detected through JavaScript | Spoof reason |
|---|---|---|---|
| Mozilla/5.0 (Macintosh; Intel Mac OS X 10_12_6) AppleWebKit/537.36 (KHTML, like Gecko) Chrome/62.0.3202.75 Safari/537.36 | Chrome 62.0.3202.75 | Gecko | Useragent saying Chrome browser but browser environment information not pointing to Chrome browser |
| Mozilla/5.0 (Macintosh; Intel Mac OS X 10.12; rv:57.0) Gecko/20100101 Firefox/57.0 | Firefox 57.0 | Webkit | Useragent saying Firefox browser but browser environment information not pointing to Firefox browser |

According to one embodiment, the script code or mobile app profile-related parameters are initially pre-processed to a form suitable for anomaly detection. Categorical features with a small number of possible values are encoded using the integer-based class label itself. One-hot encoding is used for encoding categorical features with a larger number of possible values. Strings that could have arbitrary number of characters are encoded as fixed length vectors using Recurrent Neural Network-based (RNN) auto-encoders. For strings with a single token, character-level auto-encoders are used, while for strings with multiple tokens, word-level auto-encoders are used. The pre-processing required is performed at multiple levels in the processing pipeline. Simpler forms for pre-processing are performed at the client browser level. Remaining levels of pre-processing is performed at the upstream backend components, or in the anomaly detection component 110.

The various components shown in FIG. 1 can be implemented in hardware, software, or any combination thereof. Specifically, each, some, or all of the hardware elements may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), tensor processing units (TPUs), graphics processing unit (GPUs), and the like, or any other hardware logic components that can perform calculations or other manipulations of information.

Also, software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by a processing circuitry, cause the processing circuitry to perform the various processes described herein.

Figure 2:
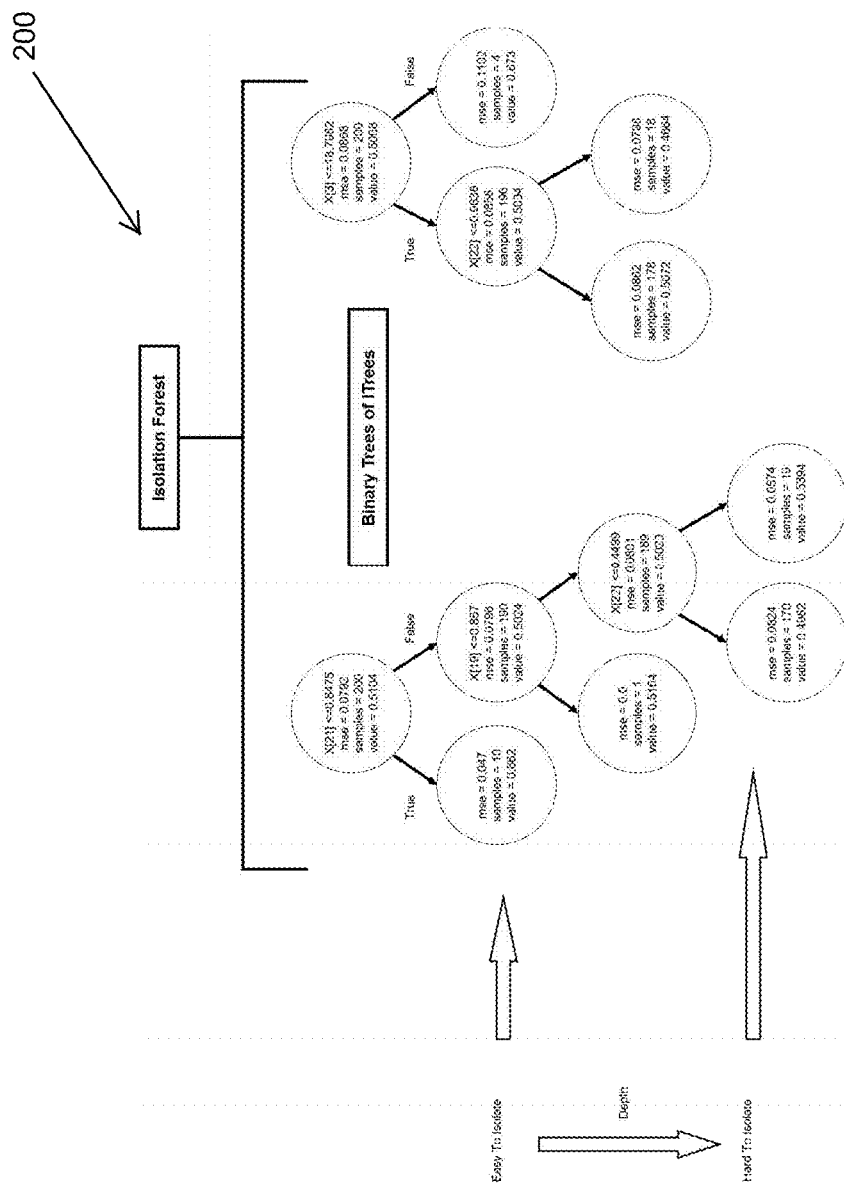
FIG. 2 illustrates a schematic depicting a tree like structure utilized in the process of bot detection, according to one embodiment.

FIG. 2 illustrates an isolation forest model 200 according to one embodiment. Here, an isolation forest-based anomaly detection is used for anomaly detection. However, any suitable anomaly detection method like local outlier factor, auto-encoders etc. may be used for this purpose. At training time, isolation forest model 200 performs recursive random partitioning of the profiles provided for training. At each step, a random feature and corresponding value is selected. The profiles are split in two based on random values (sets of profiles with feature values above and below this random value). The splitting is then repeated recursively on the two subsets forming a tree-like structure as shown in FIG. 2.

The recursive splitting terminates when a leaf node contains only one unique profile. Thus, each leaf node of the fully built tree corresponds to a unique profile. Profiles with smaller path lengths to the root are anomalous as they are easy to isolate from the rest of the profiles. Multiple such trees are randomly constructed and the average path length across these trees is used to derive the anomaly score of each instance.

According to one embodiment, for user agents used by a significant number of visitors, separate anomaly detection models are built for each unique user agent. After training, the model is used for generating an anomaly score for each new visitor having the user agent.

Figure 3:
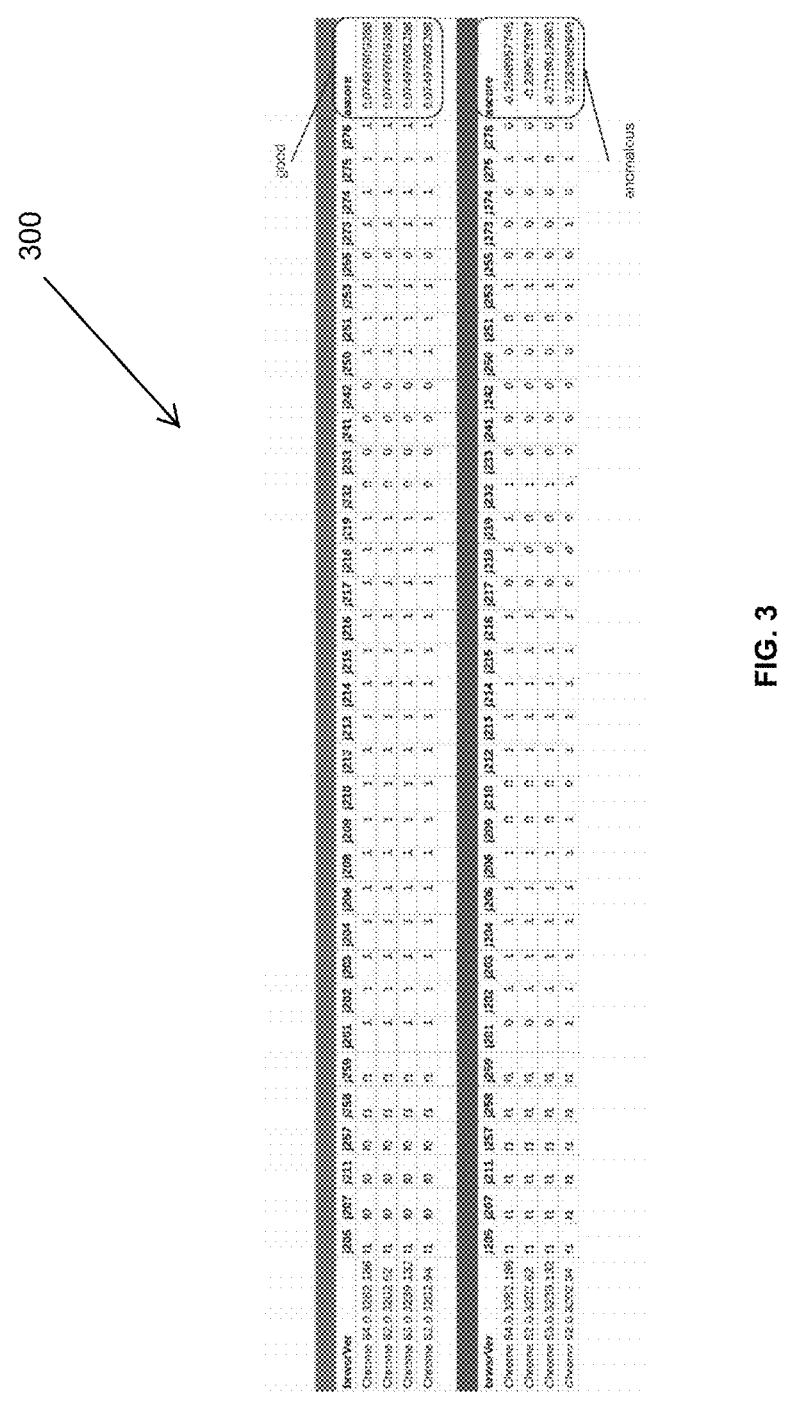

FIG. 3 illustrates a table 300 listing example anomalous JavaScript profiles detected using the system, according to one embodiment. With respect to FIG. 3, Jx denotes the JavaScript profile-base features. Multiple anomaly detection models are trained based on different subsets of parameters. In one example embodiment, three separate anomaly detection models are built using three disjoint subsets of parameters with 50 parameters per subset. The results from these multiple models are combined to generate the final anomaly score. The traffic from the remaining user agents with smaller user base is clubbed together and anomaly detection is applied on these profiles. In general, the detected profiles that have high scores are considered "good" and likely to come from a human visitor, while those that have low score are "anomalous", and likely to be a bot.

Figure 4:
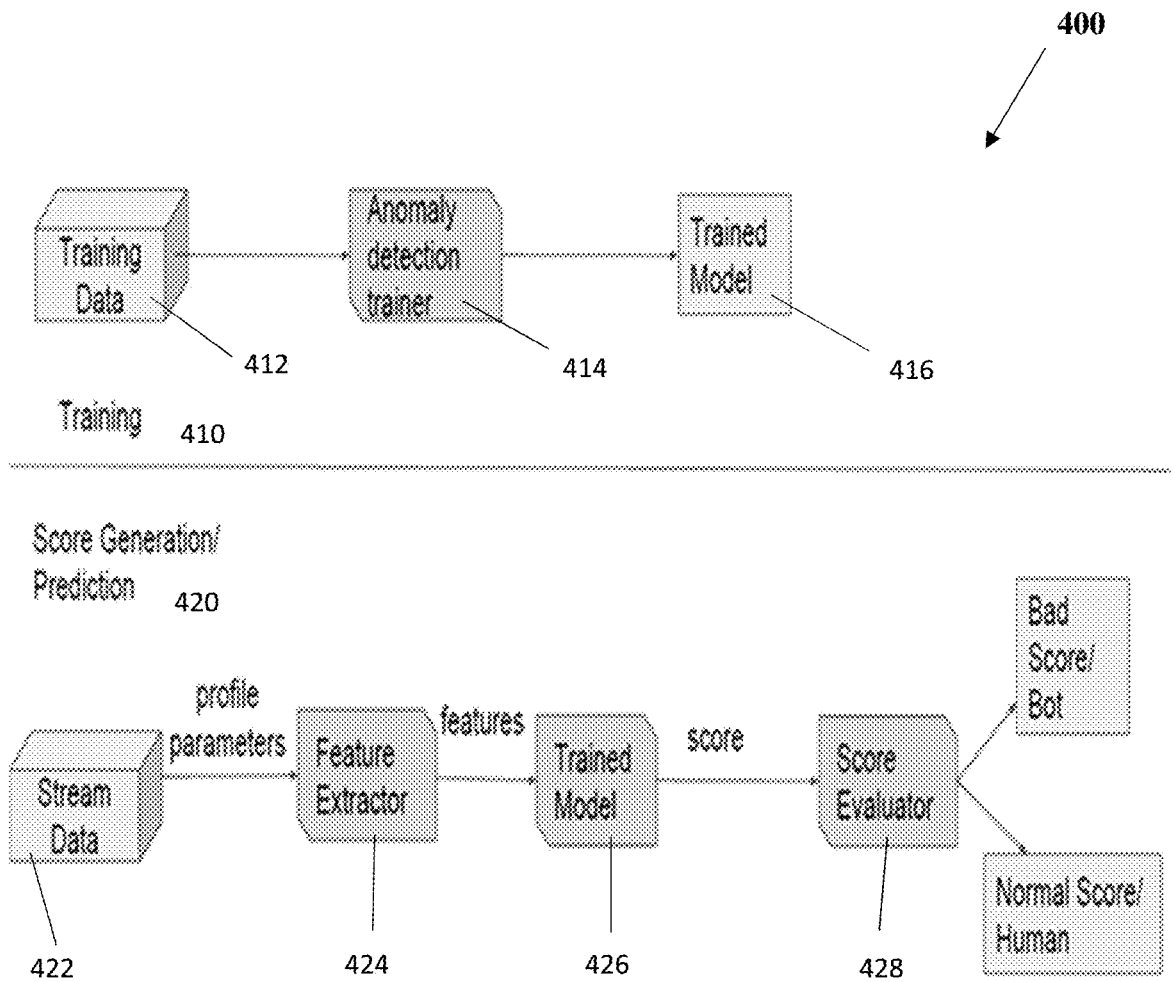
FIG. 4 illustrates a functional flow diagram of a process for training and prediction in a system for bot detection, according to an embodiment.

FIG. 4 illustrates a block diagram 400 depicting a process of training 410 and prediction 420, according to one embodiment of the present invention. With respect to FIG. 4, a training process 410 takes place, where training data 412 that includes past data collected on a visitor is sent to an anomaly detection trainer 414. Here, a past data trained model 416 is developed.

After the training is performed based on past data, the JavaScript or mobile app profiles of the new visitors are sent to a new visitor trained model 426 for generating their anomaly scores. From the incoming stream data of new visitors 422, where profile parameters of the visitors are collected in pre-processing, features are extracted using a feature extractor 424 after pre-processing and are sent to the trained model 426. Based on anomaly score generated by the trained model 426, actions like "showing Completely Automated Public Turing Test (CAPTCHA)" are taken on the suspicious visitors. The scores are then forwarded to the score evaluator 428 which evaluates the score to find out if a visitor is a bot with a bad score or a human with a normal score.

Figure 5:
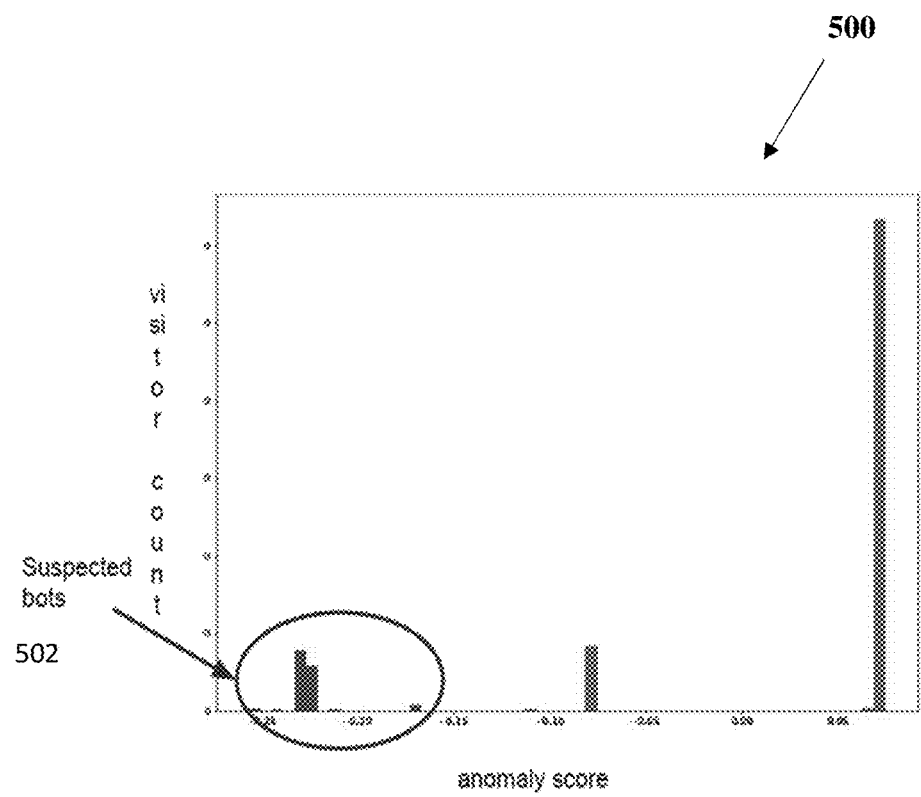
FIG. 5 illustrates a histogram of anomaly scores of the set of new visitors using a user agent, according to one embodiment.

FIG. 5 illustrates a histogram of anomaly scores of the set of new visitors using a particular user agent, according to one embodiment. The circled visitors 502, who have higher visitor counts, tend to have significantly lower scores. These lower scores indicate anomaly in the data of these visitors. Therefore, these visitors are suspected to be bots.

According to one embodiment, action is taken on the suspected bot traffic using multiple options. Fixed thresholds on the anomaly scores are set based on manual analysis and experimentation. Alternatively, the scores may be sent to an adaptive learning component, which dynamically sets the threshold based on the feedback available (e.g., CAPTCHAS getting solved). Another option is to use the score as a component in hand-crafted rules. For example, a separate rule may be set for visitors originating from data centers (a more suspicious visitor category) with stricter thresholds. Alternatively, the scores indicating anomaly may be generated offline, and the anomalous profiles are analyzed manually to extract simpler profile patterns associated with bots. These patterns are independently used as rules for bot detection.

According to one embodiment, the score generation is performed at different time scales. In a stream-based setup, score generation and threshold comparison of each new visitor profile are performed independently. In a batch-based setup, scores of a set of multiple new visitors is computed together and a threshold are set after analyzing the distribution of scores across visitors.

According to one embodiment, to reduce the impact on false positives because of misconfiguration of the thresholds or model settings, model and rule level gating is implemented. The gating limits the proportion of traffic impacted by the rules. Action is not taken against the bots flagged by the anomaly detection model after the gate thresholds are crossed. Feedback like the CAPTCHAS solved is also incorporated in the gating to further minimize the number of false positives.

That is, Gate threshold is the mechanism to keep false positive within limits. This mechanism includes simple to complex logic which involves instructions to receive feedback from CAPTCHAS, setting rate limit on number of signature created per hour/daily by each model or rule, etc. to implement the Gate Threshold.

For example, if rate limit on number of signature on specific model is five, (i.e., only up to five initial signature is allowed to be reported for the specific model before action will be taken on the bot), no action will be taken on bot after gated threshold has been crossed, or once the condition has been satisfied.

In addition to the backend, the model is also deployed at the edge, (i.e., in the client device 106). This enables faster action to be taken against bots. As an example, the model may be deployed in client-side JavaScript through JavaScript-based machine learning libraries like tensorflow.js. The model is also deployable in mobile applications through mobile app SDKs (which use external machine learning libraries like "tensorflow mobile"). In addition to the device or browser/app profile-based bot detection, such deployments are also used to perform behavior-based bot detection at the edge.

According to one embodiment, in the backend, counters are set up which counts the number of visitors from each unique user agent. When new browsers or app versions emerge, they are detected through triggers set on the counters. Models are then dynamically built and deployed for the newly active browser or app versions.

According to one embodiment, collecting a large number of JavaScript profile parameters results in page load performance issues g increases the amount of data to be processed. Further, some script code variables are more easily tampered than others. Profile parameters also vary in their utility in differentiating between bots and humans. The selection of parameters to be included in the JavaScript profile is performed by identifying sets of parameters with a combination of desirable features like correlation with known bot behavior, ease of tampering, page load latency and data size. For each potential parameter, the correlation with known bot behavior (c), ease of tampering (t), page load latency (l) and data size (d) are estimated. c is computed as the magnitude of the Pearson correlation between the visitor-wise normalized bot hits and visitor-wise normalized value of the feature (or set of features) corresponding to the parameter. Then for each parameter, a goodness value is computed as $alpha*c-beta*t-gamma*l-delta*d$ where alpha, beta, gamma and delta are positive constants. The top k parameters with high goodness values are selected to be included in the anomaly detection models. Similar methods are applied for combination of parameters too. Additional constraints like a "maximum limit on the total data transferred" are also incorporated while selecting the set of parameters.

Figure 6:
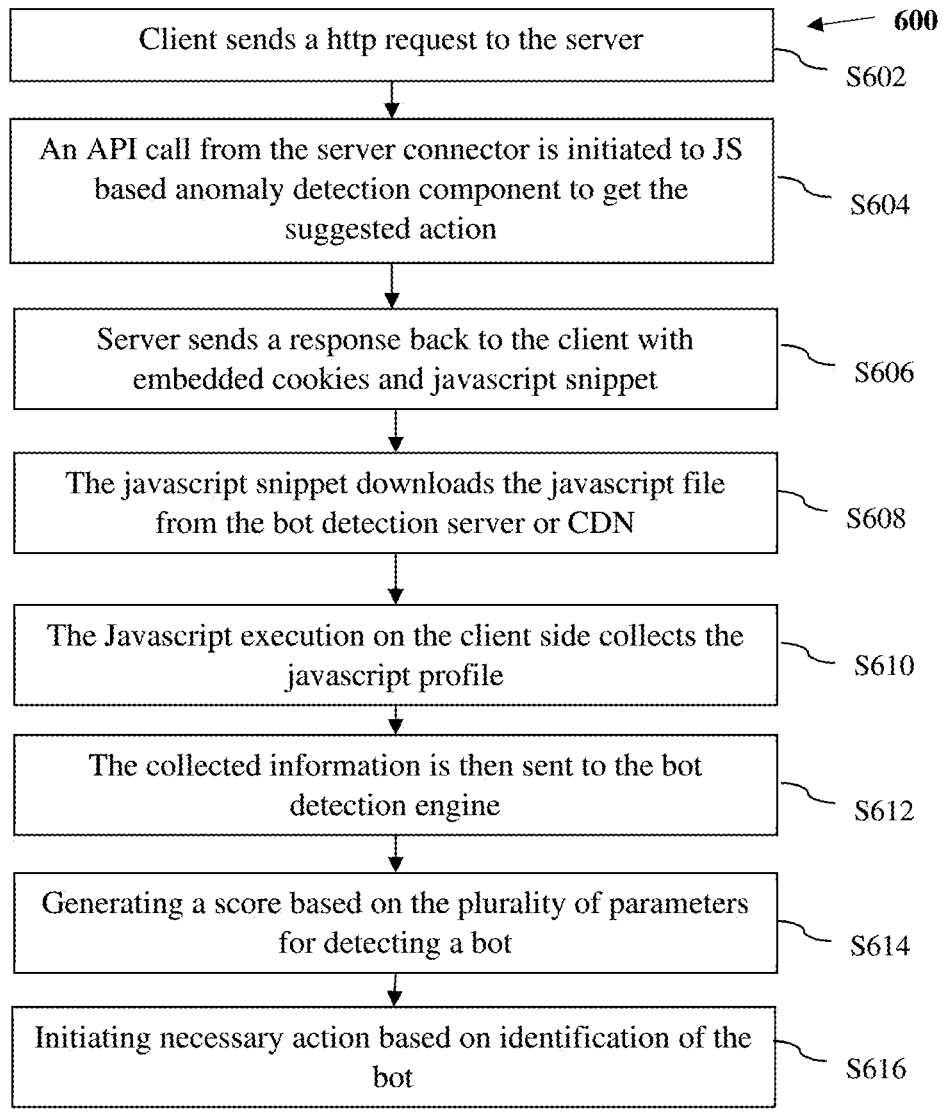
FIG. 6 illustrates a flowchart explaining a method for bot detection, according to an embodiment.

FIG. 6 illustrates a flowchart 600 depicting a method for bot detection, according to an embodiment. The method may be performed by the anomaly-based detection component 110 implemented within the bot detection engine (e.g., the engine 102, FIG. 2).

At S602, a HTTP request is received at the server 104. The request is sent by a client attempting to access a web property. At S604, an API call from the server connector is initiated in response to the received HTTP request. At S606, a response is sent back to the client with embedded tracking code and a script code snippet. The script code snippet, when executed on the client, causes the client to download the JavaScript file from the bot detection engine (e.g., the engine 102) or CDN. The script code file, when executed on the client, execution on the client is configured to collect the script code profile. At S612, the collected information is then received at the bot detection engine 102.

At S614, based on the collected profile a score is generated based on a plurality of parameters. The parameters may come from profiles from the trained model of past visitor data, and from models built for each new visitor. Multiple models may then be combined to generate a final anomaly score. For example, as described in FIG. 4, incoming stream data of new visitors 422, where profile parameters of the visitors are collected in pre-processing, features are extracted using a feature extractor 424 after pre-processing and are sent to the trained model 426. The score indicates if the client runs a bot. For example, the score may be evaluated to find out if the client run a bot. Here, the client is running a bot if the score is low, which indicate anomaly in the data of the client.

Fixed thresholds on the anomaly scores are set based on manual analysis and experimentation. Alternatively, the scores may be sent to an adaptive learning component, which dynamically sets the threshold based on the feedback available (e.g., CAPTCHAS getting solved). Another option is to use the score as a component in hand-crafted rules. For example, a separate rule may be set for visitors originating from data centers (a more suspicious visitor category) with stricter thresholds. Alternatively, the scores indicating anomaly may be generated offline, and the anomalous profiles are analyzed manually to extract simpler profile patterns associated with bots. These patterns are independently used as rules for bot detection.

According to one embodiment, the score generation is performed at different time scales. In a stream-based setup, score generation and threshold comparison of each new visitor profile are performed independently. In a batch-based setup, scores of a set of multiple new visitors is computed together and a threshold are set after analyzing the distribution of scores across visitors.

If it is determined that the client runs a bot, at S616, a mitigation action is initiated based on identification of the bot. The mitigation may include blocking the client from accessing the server, reporting the client's IP address, sending an alert, and so on.

The various embodiments provide a JavaScript or mobile app profile-based bot detection system. The system and method use unsupervised machine learning-based anomaly detection of the JavaScript or mobile app profiles of the visitors coming to a website. The system and method allow user agent-wise separate model building for each unique user agent. After training, the model is used for generating an anomaly score for each new visitor having the user agent. The system and method also allow combining of user agents with lower traffic. The profile-related parameters are initially pre-processed to a form suitable for anomaly detection. Moreover, the system and method combine HTTP headers and TCP parameters with JavaScript or mobile app profile for bot detection.

Further, the anomaly scores are utilized to take action against bots. The system and method are also capable of detecting new browser versions and performing bot detection of such browsers. Additionally, the system and method limit the impact on false positives by incorporating rule or model-wise gating which restricts the proportion of visitors on which action is taken.

That is, the embodiments herein provide a system and method for JavaScript or mobile app profile-based bot detection. The system and method help in detecting bots which are spoofing their browsers and devices based on their JavaScript or mobile app profiles. The system and method perform unsupervised machine learning-based anomaly detection of the profiles of the visitors coming to a website. Separate anomaly detection models are trained based on the JavaScript or mobile app profiles of the set of visitors using each major user agent. After training, the model is used for generating an anomaly score for each new visitor. The results from these multiple models are combined to generate the final anomaly score. Action is taken on the suspected bot traffic using multiple options. Fixed thresholds on the anomaly scores are set based on manual analysis and experimentation. The scores are sent to an adaptive learning component which dynamically sets the threshold based on the feedback available Although the embodiments herein are described with various specific embodiments, it will be obvious for a person skilled in the art to practice the embodiments herein with modifications.

Figure 7:
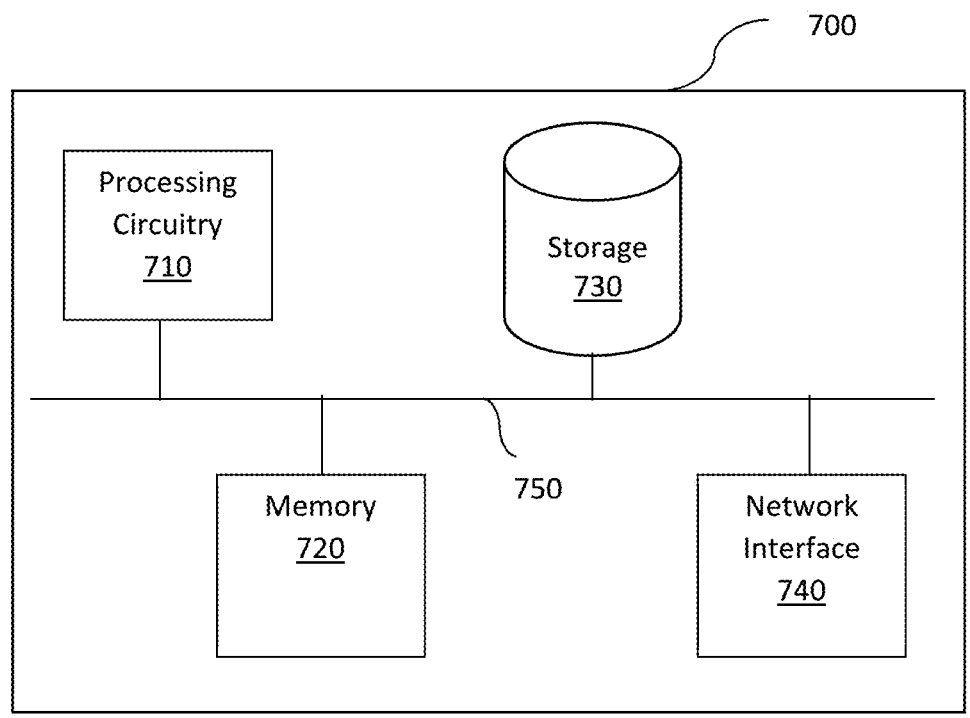
FIG. 7 is a schematic diagram of a bot detection system according to an embodiment.

FIG. 7 is an example schematic diagram of a bot detection system 700 according to an embodiment, which may be embodied as the bot detection engine 102 as shown in FIG. 1. The system 700 includes a processing circuitry 710 coupled to a memory 720, a storage 730, and a network interface 740. In an embodiment, the components of the system 100 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 720 may be volatile (e.g., RAM, etc.), non-volatile (e.g., ROM, flash memory, etc.), or a combination thereof. In one configuration, computer readable instructions to implement one or more embodiments disclosed herein may be stored in the storage 730.

In another embodiment, the memory 720 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein for detecting and block bots. In an embodiment, the processing circuitry 710 is configured to perform the process described with reference to FIG. 7.

The storage 730 may be magnetic storage, optical storage, and the like, and may be realized, for example, as flash memory or other memory technology, CD-ROM, Digital Versatile Disks (DVDs), or any other medium which can be used to store the desired information. Such information may include labelled data, visitors classified as bots, access patterns of visitors, and so on.

The network interface 740 allows the system 700 to communicate with various components to receiving past and current labelled data, block visitors labelled as bots, and communicate with other sources for reporting. The network interface 740 may allow communication over wired and/or wireless networks.

It should be understood that the embodiments described herein are not limited to the specific architecture illustrated in FIG. 7, and other architectures may be equally used without departing from the scope of the disclosed embodiments.

The various embodiments of the embodiments herein provide a system and method for detecting bots using a semi-supervised deep learning (SDL) technique that minimizes involvement of humans in hand-crafting features. The system and method described herein enhance accuracy in identifying bots by minimizing false positives.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements includes one or more elements.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting bots, comprising: receiving a request to access a server, the request being received from a client device; responsive to the request, causing the client device to download a script code file to the client device, wherein the script code file, when executed, collects a profile, the profile including a plurality of parameters receiving the profile; generating a score based on the plurality of parameters to identify a bot; and initiating a mitigation action based on the identified bot.

2. The method of claim 1, wherein generating a score based on the plurality of parameters to identify a bot further comprises: detecting an anomaly within the plurality of parameters.

3. The method of claim 2, further comprising:
developing a first trained model by collecting past data on the client device;
detecting anomaly based on the collected past data; and
developing the first trained model based on the detected anomaly.

4. The method of claim 3, wherein generating the score further comprises:
collecting the profile parameters of a user;
extracting a plurality of features from the profile parameters;
analyzing the extracted plurality of features in a second trained model; and
generating an anomaly score based on the analysis of the extracted plurality of features, wherein the anomaly score is the generated score.

5. The method of claim 1, wherein the plurality of parameters describes one of: a browser characteristics and a client device characteristics.

6. The method of claim 1, wherein the client device is determined as the bot, when the score associated to the visitor exceeds a predetermined threshold.

7. The method of claim 1, wherein identifying the bot further comprises:
identifying a bot-associated score; and
identifying the client device as the bot, when the generated score associated is lower than or equal to the identified bot-associated score.

8. The method of claim 1, wherein identifying the bot further comprises:
identifying an anomalous profile;
extracting a bot-associated profile pattern based on the anomalous profile; and
setting the bot-associated profile pattern as a rule for identifying the bot.

9. The method of claim 1, further comprising:
determining a gate threshold based on one of a predetermined model, a predetermined rule, or CAPTCHAS feedback; and
refraining from taking action on the identified bot, when the gate threshold is exceeded.

10. A system for detecting bots, comprising: a processing circuitry; and a memory, the memory containing instructions that, when executed by the processing circuitry, configure the system to: receive a request to access a server, the request being received from a client device; responsive to the request, cause the client device to download a script code file to the client device, wherein the script code file, when executed, collects a profile, the profile includes a plurality of parameters; receive the profile; generate a score based on the plurality of parameters to identify a bot; and initiate a mitigation action based on the identified bot.

11. The system of claim 10, wherein generating a score based on the plurality of parameters to identify a bot further comprises: detecting an anomaly within the plurality of parameters.

12. The system of claim 11, wherein the system is further configured to:
develop a first trained model by collecting past data on the client device;
detect anomaly based on the collected past data; and
develop the first trained model based on the detected anomaly.

13. The system of claim 12, wherein generating the score further comprises:
collecting the profile parameters of a user;
extracting a plurality of features from the profile parameters;
analyzing the extracted plurality of features in a second trained model; and
generating an anomaly score based on the analysis of the extracted plurality of features, wherein the anomaly score is the generated score.

14. The system of claim 10, wherein the plurality of parameters describes one of: a browser characteristics and a client device characteristics.

15. The system of claim 10, wherein a visitor is determined as the bot, when the score associated to the visitor exceeds a predetermined threshold.

16. The system of claim 10, wherein identifying the bot further comprises:
   identifying a bot-associated score; and
   identifying the client device as the bot, when the generated score associated is lower than or equal to the identified bot-associated score.

17. The system of claim 10, wherein identifying the bot further comprises:
   identifying an anomalous profile;
   extracting a bot-associated profile pattern based on the anomalous profile; and
   setting the bot-associated profile pattern as a rule for identifying the bot.

18. The system of claim 10, wherein the system is further configured to:
   determine a gate threshold based on one of a predetermined model, a predetermined rule, or CAPTCHAS feedback; and
   refrain from taking action on the identified bot, when the gate threshold is exceeded.

19. A non-transitory computer readable medium having stored thereon instructions for causing a processing circuitry to execute a process for detecting bots, the process comprising: receiving a request to access a server, the request being received from a client device; responsive to the request, causing the client device to download a script code file to the client device, wherein the script code file, when executed, collects a profile, the profile includes a plurality of parameters receiving the profile; generating a score based on the plurality of parameters to identify a bot; and initiating a mitigation action based on the identified bot.

* * * * *